Patented Aug. 14, 1951

2,563,884

UNITED STATES PATENT OFFICE 2,563,884

MERCAPTALATION OF SUGAR

James Masanobu Sugihara, Salt Lake City, Utah, assignor to Sugar Research Foundation, Inc., New York, N. Y., a corporation of New York No Drawing. Application May 24, 1947, Serial No. 750,375

5 Claims. (Cl. 260—209)

1

This invention relates to the catalytic mercaptalation of sugars. More particularly, my invention relates to the mercaptalation of sugar liquors containing sucrose and to a novel means for utilizing the fructose remaining after the mercaptalation.

Sucrose is a polysaccharide resulting from the condensation of a molecule of dextrose with a molecule of fructose. Since the acid hydrolysis of sucrose results in the ready production of almost quantitative yields of equal amounts of dextrose and fructose, sucrose may be considered to be a cheap source for these two reducing sugars. In spite of this fact, the problem of profitably utilizing the dextrose and fructose available from sucrose has hitherto been a difficult one. This is due to the excessive solubility of fructose in water, and to the difficulty and expense involved in obtaining reasonable yields of both of these sugars in crystalline form from inverted sucrose.

A successful means for utilizing both the dextrose and the fructose available in sucrose would be of considerable commercial importance not only from the standpoint of increased markets for pure crystalline sucrose, but particularly from the standpoint of utilizing the sucrose present in raw or spent commercial sugar liquors, such as sugar cane juice or beet sugar molasses. It has been found that the dextrose and fructose available from pure or crude sucrose liquors may both be profitably utilized by means of direct sucrose liquor mercaptalation followed by the conversion of the non-mercaptalated fructose to levulinic acid.

Accordingly, one of the objects of this invention is to provide a means for simultaneously splitting and mercaptalating a polysaccharide such as sucrose.

Another object is to provide a process for directly mercaptalating the sucrose in raw sugar liquors or in cane or beet sugar juices.

A further object of the invention is to provide a process which enables the direct production of useful dextrose and fructose derivatives from raw or spent sucrose liquors or from cane or beet sugar juices.

A further object of my invention is to provide a process which enables the direct production of glucose mercaptals from raw or spent sucrose liquors or juices, and which enables the production of levulinic acid from the crude fructose left after the mercaptalation of the crude sugar liquors.

Still another object is to provide an improved sugar mercaptalation process which enables optimum glucose mercaptal yields with lower alkyl mercaptans.

I have discovered that polysaccharides which yield aldose on splitting do not have to be subjected to a previous splitting before mercaptalating the aldose.

I have also discovered that polysaccharides whose molecules consist of condensation products of aldoses and ketoses may have their aldoses mercaptalated without any accompanying ketose mercaptalation by subjecting such polysaccharides to direct mercaptalation in the presence of mineral acid catalysts.

It has been found that when aqueous sucrose solutions are mercaptalated in the presence of mineral acid or acid salt catalysts, a simultaneous sucrose splitting and mercaptalation takes place with the simultaneous production of glucose mercaptal and free fructose. Such mercaptalations readily take place with lower primary mercaptans. With higher molecular weight mercaptans, such as lauryl mercaptan, the reaction is minor, and in the case of lower secondary or tertiary mercaptans, little or no reaction takes place. Mercaptalation with lower primary mercaptans may be readily carried out not only with sucrose, but with other aldose-containing polysaccharides, such as maltose, starch, or dextrins.

After discovering that it was possible to obtain glucose mercaptal in good yield by the direct mercaptalation of pure sucrose, attempts were amed to directly mercaptalate crude sugar liquors, such as molasses, and low-grade raw beet sugar liquors. Since these liquors consists of numerous and complex impurities, it was expected that the mercaptalation of the sucrose in these crude liquors would result in considerably lower yields than those obtained when starting with pure sucrose. Actual tests, however, led to the unexpected discovery that it is possible to obtain substantially the same yields of glucose mercaptal with crude sugar liquors as those obtained when starting with pure sucrose. This discovery is of practical commercial significance, since it enables the production of valuable glucose and fructose products from crude sugar liquors at a cost considerably less than that which would prevail if one started with pure sucrose. My discovery of a means for effectively removing sucrose from crude sugar liquors, particularly molasses, by means of mercaptalation also enables a more profitable utilization of the non-sucrose materials contained in molasses.

Numerous factors enter into the obtaining of optimum yields for individual glucose mercaptals. In working with the methyl, ethyl, n-propyl, and n-butyl mercaptans, I have found that the best conditions of such variables as temperature, time, acid strength, and acid volume vary with each glucose mercaptal. Hydrochloric acid is the best catalyst from the standpoint of yields and general workability. In going from methyl to butyl glucose mercaptals, the general trend with increasing mercaptan molecular weight, for optimum yields, is increased hydrochloric acid concentration as well as acid volume. It has been discovered that best yields for the individual methyl, ethyl, n-propyl, and n-butyl glucose mercaptals are obtained when the concentration of the hydrochloric acid catalysts is about 8, 9, 10, and 11 molar, respectively. It has also been found that best yields with these molar acid concentrations are obtained when one mole of sucrose is dissolved in about 0.3 liter of acid solution containing about 2.3 moles of hydrochloric acid in the case of methyl mercaptan. When working with ethyl mercaptan, best results occur when a mole of sucrose is dissolved in about 0.4 liter of acid containing 3.5 moles of hydrochloric acid. In the case of n-propyl mercaptan, the best results are obtained when a mole of sucrose is dissolved in 0.68 liter of acid containing 6.8 moles of hydrochloric acid. With n-butyl mercaptan, best results are obtained when a mole of sucrose is dissolved in 0.65 liter of acid containing 7.1 moles of hydrochloric acid.

The volume of hydrochloric acid used is an important variable. When the volume is too small, free mixing of the aqueous and mercaptan layers becomes difficult, and the viscosity of the solution resulting from the addition of sucrose to the hydrochloric acid becomes excessive.

The optimum volume of hydrochloric acid varies with each mercaptan, and the specific optimum volumes for individual mercaptans are given above. When working with crude sugar liquors, particularly with molasses, it has been found that in order to obtain good yields, it is necessary to bring the molasses to the necessary acid concentration by means of a combination of concentrated aqueous hydrochloric acid and hydrogen chloride gas. The latter is necessary in order that the volume of acidified molasses should not be increased to such an extent that mercaptal yields will be deleteriously affected.

Having now indicated in a general way the nature and purpose of this invention, there follows a more detailed description of the invention in the form of examples.

EXAMPLE I

*Glucose dimethyl mercaptal from sucrose*

35.5 grams (0.104 mole) of pure sucrose were dissolved in 30 cc. of 8 M hydrochloric acid, and the resulting acidified sugar solution transferred to a reaction flask. The mixture was cooled to −5° C., and 10 grams (0.208 mole) of methyl mercaptan added. The reaction medium was vigorously stirred for about 50 minutes while being maintained at −5° C. The reaction flask was then maintained at about 0° C. for about 5 hours. There resulted a solid cake consisting substantially of a mixture of mercaptal, fructose, and aqueous hydrochloric acid. The solid cake was broken up, mixed with about 25 cc. of ice water, and transferred to a suction filter. The filter cake, consisting of crude mercaptal, was removed from the filter, suspended in about 25 cc. of ice water, and re-filtered. The filter cake was washed until the hydrochloric acid and fructose were removed. The resulting crude glucose dimethyl mercaptal was re-crystallized from hot water, filtered, and dried. There was obtained 12 grams of mercaptal, representing about 45 per cent of theoretical yield.

The yield of glucose dimethyl mercaptal is significantly affected by hydrochloric acid volume and concentration. With 7, 8, and 9 molar acid concentrations, the yields were 12, 45, and 19 per cent, respectively, all other conditions being equal. When the ratio of weight of sucrose in grams to cc. of 8 M hydrochloric acid is 1 to 0.85, maximum yields are obtained. When the ratio is 1 to 0.99, somewhat lower yields result; and when the ratio is 1 to 0.70, considerably lower yields are obtained, namely, about 20 per cent as against 45 per cent with optimum conditions.

EXAMPLE II

*Glucose diethyl mercaptal from sucrose*

To 183 cc. of 9 M hydrochloric acid in a 500 cc. reaction flask there was added 171 grams (0.5 mole) of sucrose. The solution was cooled by means of an ice bath to 0° C. and thereafter 78 cc. (1 mole) ethyl mercaptan was added. The contents were vigorously stirred while maintaining the reaction medium at 0° C. until solidification began. The semi-solid material was transferred into a 600 cc. beaker at 0° C. for about 4 hours. The resulting solid cake, consisting of a mixture of mercaptal, fructose, and hydrochloric acid solution, was transferred to a suction filter with a minimum amount of ice water. The filter cake was broken up and suspended in sufficient ice water to obtain a mushy suspension. Washing and filtering were repeated at least three times, or until only traces of hydrochloric acid remained. The final filter cake is preferably washed with a small amount of diethyl ether to remove substances which tend to discolor the product as well as any unreacted mercaptan. The washed filter cake was then air-dried. There was obtained 100 grams of white, stable, dry glucose diethyl mercaptal, which represents about a 70 per cent yield.

Yields are affected by acid concentration and volume. At 10 M, the yield is about 61 per cent. At a sucrose-9 M acid ratio of between about 1 to 1.1 and 1 to 1.3, optimum yields of about 65 to 70 per cent are obtained. At a ratio of 1 to 0.93, the yield is about 39 per cent, and at a ratio of 1 to 1.4, the yield is about 49 per cent.

EXAMPLE III

*Glucose dipropyl mercaptal from sucrose*

171 grams (0.5 mole) of sucrose were dissolved in 335 cc. of 10 M. hydrochloric acid in a liter flask. The resulting solution was cooled in an ice bath. There was then rapidly added 94.4 cc. of n-propyl mercaptan, and the resulting reaction medium was vigorously stirred until the extent of solid formation prevented further mixing. During this time the batch was maintained at 0° C. This operation requires about 40 minutes, The resulting solid mass was transferred to a 600 cc. beaker and maintained at about 0° C. for about 5 hours. The resultant hard cake, consisting of mercaptal, fructose, and hydrochloric acid solution, was broken up and transferred to a suction filter with a minimum of ice water. The pressed filter cake was then broken up and resuspended in ice water. The mercaptal was then filtered, and this operation of filtering and resuspension in ice water repeated until substantially all of the hydrochloric acid had been removed. The washed mercaptal filter cake was then given a final wash of diethyl ether to remove the light yellow color which contaminated the product. The filter cake was air-dried, and the dry product, consisting of glucose dipropyl mercaptal, weighed 120 grams, representing about a 76 per cent yield.

With 11 M acid, under the same conditions, the yield was 71 per cent. At a sucrose-10 M acid gram to cc. ratio of between 1 to 1.8 and 1 to 2.1, yields of about 76 to 78 per cent are obtained.

EXAMPLE IV

*Glucose dibutyl mercaptal from sucrose*

171 grams (0.5 mole) of sucrose were dissolved in 336 cc. of 11 M hydrochloric acid in a liter flask. The resulting solution was cooled in an ice bath. There was then rapidly added 127 cc. of 85 per cent n-butyl mercaptan. The mixture was then subjected to the same treatment as that described in Example III. There was obtained 130 grams of dry glucose dibutyl mercaptal, representing a 76 per cent yield.

With 12 M acid, the yield is about 63 per cent. Best yields are obtained when the sucrose-acid gram to cc. ratio is between 1 to 1.4 and 1 to 2.3.

EXAMPLE V

*Glucose dibutyl mercaptal from cane molasses*

Ordinary cane molasses contains between 33 and 38 per cent sucrose, and between about 16 and 21 per cent invert sugar, the total sugar in the molasses ranging between about 50 and 60 per cent. A sufficient volume of cane molasses analyzing 52 per cent total sugar was measured so as to be equivalent to 30 grams of sugar dry substance. This cane molasses was mercaptalated with 20 cc. of n-butyl mercaptan in the presence of 50 cc. of 11 M hydrochloric acid at 0° C. under the same conditions as that described in Example IV. The 50 cc. of 11 M hydrochloric acid represents the total aqueous volume of the reaction mixture, and includes the water in the original molasses. By knowing the water content of the molasses, one may calculate the correct volume and strength of aqueous acid necessary to make a total volume of 50 cc. 11 M solution. This is best accomplished when a part of the hydrochloric acid is added to the reaction mixture in the gaseous form. It is preferable to first dilute the molasses with concentrated hydrochloric acid solution and then bring the reaction mixture up to 11 molar strength by the addition of hydrogen chloride gas.

The mercaptalation was carried out under the same conditions as that described in Example IV. There was obtained 18.2 grams of glucose dibutyl mercaptal, representing a 67 per cent yield. This compares with a 74 per cent yield when starting with pure sucrose.

Better results are obtained with molasses when a part of the acid is added in gaseous form. This permits a regulation of the total concentration of acid as well as the total aqueous volume. The addition of a small volume of aqueous acid prior to the gaseous hydrogen chloride increases the fluidity of the viscous molasses and makes ready mixing possible with the mercaptan. Excessive viscosity of the reaction mixture also makes subsequent mercaptal filteration impractical.

EXAMPLE VI

*Glucose dibutyl mercaptal from other sucrose sources*

In Table 1, shown below, there are submitted the results obtained when various sucrose materials were subjected to n-butyl mercaptan treatment by the same method described in Example V.

TABLE 1

[30 grams sugar+20 cc. n-butyl mercaptan+50 cc. 11 M HCl mixed at 0° C.]

| Source of Sugar | Mixing Time (Minutes) | Hours at 0° C. | Grams of Mercaptal | Per Cent Yield |
|---|---|---|---|---|
| Sucrose | 45 | 4.5 | 20.3 | 74 |
| "Intermediate Raws" | 45 | 4 | 19.9 | 73 |
| "Low-grade Raws" | 50 | 4 | 20.1 | 74 |
| Brown Cane Sugar | 44 | 4 | 19.5 | 72 |
| Cane Molasses | 60 | 3.5 | 18.2 | 67 |
| Beet Molasses | 60 | 3.5 | 13.4 | 49 |

EXAMPLE VII

*Glucose diethyl mercaptal from various sucrose sources*

In Table 2, shown below, there are submitted the results obtained when various sucrose materials were subjected to ethyl mercaptan treatment by the same method as that described in Example II. In the case of cane molasses and beet molasses, better results were obtained when the hydrochloric acid was added to the molasses in the combined form of 9 molar solution and gaseous hydrochloride in order that the optimum volume of 9 M hydrochloric acid be obtained for best mercaptal yields. The reasons for the use of gaseous hydrogen chloride have been given in Example V.

TABLE 2

[171 grams sucrose+78 cc. ethyl mercaptan+9 M HCl mixed at 0° C.]

| Source of Sugar | cc. HCl | Mixing Time (Minutes) | Hours at 0° C. | Grams of Mercaptal | Per Cent Yield |
|---|---|---|---|---|---|
| Sucrose | 183 | 33 | 5 | 98 | 69 |
| Brown Cane | 183 | 44 | 4 | 88 | 62 |
| Sucrose | 220 | 32 | 5 | 95 | 67 |
| Brown Cane Sugar | 220 | 65 | 4 | 95 | 67 |
| "Intermediate Raws" | 183 | 38 | 6 | 100 | 70 |
| "Low-grade Raws" | 183 | 42 | 5.5 | 82 | 57 |

The above tables illustrate the unexpectedly good yields obtained with molasses and crude sugars as compared to yields obtained with pure sucrose when operating at 0° C. Similar results are obtained when mercaptalating at 20° C. Between zero and 20° C., optimum yields are obtained. Above or below this range, the yields are materially lowered. Similar comparative results may be obtained when using either methyl or propyl mercaptan.

The "intermediate raws" and the "low-grade raws" referred to in Tables 1 and 2 are secondary products formed during the production of sugar from beets. They are usually purified by returning to an earlier stage of the processing. In place of the commercial cane or beet molasses referred to in the tables, one may use dehydrated molasses and obtain similar results.

EXAMPLE VIII

*Levulinic acid from glucose mercaptal filtrates*

The fructose filtrates obtained in the preparation of the glucose mercaptals of Examples I through VII were combined, and a portion of 1.5 liters of the combined filtrate containing about 1.5 moles of fructose was used for levulinic acid production. To this liquor there was added 100 cc. of concentrated hydrochloric acid, which made the acid concentration of the acidified mixture about 6 molar. The acidified fructose solution was then heated at a simmer for 3 hours and then placed on a boiling-water bath for 42 hours. The black solid which formed was removed by filtration and washed with water. The washings were added to the filtrate, and the latter then evaporated nearly to dryness. The resulting mixture of black liquor and solids was extracted with ethyl ether for 48 hours and then filtered. The ether was then removed by evaporation and the remaining black solution vacuum-distilled. The distillate boiling between 130 and 190° C. was recovered and re-distilled at reduced pressure. This gave 55 grams of levulinic acid, representing a 15.8 per cent yield. When a similar run was made with pure sucrose, there was obtained a 22 per cent yield of levulinic acid.

One may also obtain levulinic acid from the glucose mercaptal filtrates containing fructose by subjecting these filtrates to a levulinic acid conversion under superatmospheric pressure conditions. The mercaptal filtrate need not necessarily be a combined filtrate from two or more mercaptalations with different mercaptans, but can, of course, be a filtrate containing fructose and originating from an individual mercaptalation, such as, for instance, the filtrate obtained from glucose dibutyl mercaptal.

Although my preferred mercaptalating catalyst is hydrochloric acid, one may, if one desires, use other acid or acid salt catalysts. The acid preferably should be one which brings about aldose mercaptalation without any deleterious effects on sucrose or fructose. The choice of mercaptan depends upon the type of mercaptal sought and on the commercial availability of the mercaptan. Any mercaptan capable of reacting with the aldehydic group of an aldose may be used, preferably a mercaptan having no destructive effect on sucrose or fructose. Thus, alkylene mercaptans, such as ethylene or butylene primary mercaptans may be used.

Although preferred methods of operating my invention have been given, many variations in procedure or in the material processed will be apparent which may be made without departing from the spirit of the invention. The invention is not to be construed as being limited by such described procedure as herein taught nor by the examples given, but is to be limited only as set forth in the accompanying claims forming a part of this specification.

I claim:

1. A process for obtaining glucose dimethyl mercaptal which comprises: dissolving sucrose in about 8 molar aqueous hydrochloric acid, cooling the acid sucrose solution to about −5° C., adding methyl mercaptan, mercaptalating the sugar solution at about −5° C. with simultaneous agitation of the reaction medium for about one hour, maintaining the reaction medium quiescent at about 0° C. for substantially five hours whereby a solid cake of crude glucose dimethyl mercaptal is produced; disintegrating and suspending said cake in ice water, filtering and washing with ice water until substantially all of the excess hydrochloric acid is removed, redissolving the washed cake in hot water and re-crystallizing the glucose dimethyl mercaptal.

2. Process for the production of glucose diethyl mercaptal which comprises dissolving sucrose in about 9 molar aqueous hydrochloric acid catalyst; cooling the acid sucrose solution to about 0° C.; adding ethyl mercaptan and mercaptalating the sugar solution at about 0° C. with simultaneous agitation of the reaction medium; subsequently maintaining the reaction medium quiescent at about 0° C. for about four hours whereby a substantially solid cake of crude glucose diethyl mercaptal is obtained; disintegrating said cake and suspending it in ice water; filtering the suspension; washing the filter cake with ice water until substantially all of the acid catalyst is removed; and drying the washed glucose diethyl mercaptal filter cake.

3. Process for the production of glucose dipropyl mercaptal which comprises: dissolving sucrose in about 10 molar aqueous hydrochloric acid catalyst; cooling the acid sucrose solution to about 0° C.; adding n-propyl mercaptan and mercaptalating the sugar solution at about 0° C. with simultaneous agitation of the reaction medium; subsequently maintaining the reaction medium quiescent at about 0° C. for about four hours whereby a substantially solid cake of crude glucose dipropyl mercaptal is formed; disintegrating said cake and suspending it in ice water; filtering the suspension; washing the filter cake with ice water until substantially all of the acid catalyst is removed; and drying the washed glucose dipropyl mercaptal filter cake.

4. Process for the production of glucose dibutyl mercaptal which comprises: dissolving sucrose in about 11 molar aqueous hydrochloric acid catalyst; cooling the acid sucrose solution to about 0° C.; adding n-butyl mercaptan and mercaptalating the sugar solution at about 0° C. with simultaneous agitation of the reaction medium; subsequently maintaining the reaction medium quiescent at about 0° C. for about four hours whereby a substantially solid cake of crude glucose dibutyl mercaptal is formed; disintegrating said cake and suspending it in ice water; filtering the suspension; washing the filter cake with ice water until substantially all of the acid catalyst is removed; and drying the washed glucose dibutyl mercaptal filter cake.

5. A process for obtaining a glucose dialkyl mercaptal which comprises dissolving sucrose in about from 8 to 11 molar aqueous hydrochloric acid, cooling the resultant acid sucrose solution to about −5° C., adding an alkyl mercaptan, mercaptalating the resulting sugar solution at about −5° C. with simultaneous agitation of the reaction medium for about one hour, maintaining the reaction medium quiescent at about 0° C. for substantially five hours whereby a solid cake of a crude glucose dialkyl mercaptal is produced, disintegrating and suspending said cake in ice water, filtering and washing with ice water until substantially all of the excess hydrochloric acid and soluble material is removed, then dissolving the thus washed cake in hot water and recrystallizing therefrom the formed glucose dialkyl mercaptal.

JAMES MASANOBU SUGIHARA.

REFERENCES CITED

The following references are of record in the file of this patent:

UNITED STATES PATENTS

| Number | Name | Date |
|---|---|---|
| 1,895,414 | Helwig | Jan. 24, 1933 |
| 2,295,760 | Schreiber | Sept. 15, 1942 |

OTHER REFERENCES

Fischer: Berichte, v. 27 (1894), pp. 673–679, 7 pages.

Uyeda et al.: Bull. Chem. Soc., Japan, v. 1 (1926), pp. 179–182, 4 pp.; v. 4 (1929), pp. 264–265, 2 pp.

Wolfrom et al.: JACS, vol. 56 (1934), pp. 880–881, 2 pages; vol. 61 (1939), pp. 1072, 2172, 2 pages; vol. 63 (1941), p. 1338, 1 page; vol. 65 (1943), p. 255, 1 page; vol. 67 (1945), pp. 500–501, 2 pages.